(12) United States Patent
Fabian

(10) Patent No.: US 8,794,561 B2
(45) Date of Patent: Aug. 5, 2014

(54) WIRE DISPENSING APPARATUS FOR PACKAGED WIRE

(75) Inventor: Gabor Fabian, Brampton (CA)

(73) Assignee: Lincoln Global, Inc., City of Industry, CA (US)

(*) Notice: Subject to any disclaimer, the term of this patent is extended or adjusted under 35 U.S.C. 154(b) by 298 days.

(21) Appl. No.: 12/882,550

(22) Filed: Sep. 15, 2010

(65) Prior Publication Data

US 2011/0000998 A1    Jan. 6, 2011

Related U.S. Application Data

(62) Division of application No. 12/401,154, filed on Mar. 10, 2009, now Pat. No. 7,938,352.

(51) Int. Cl.
*B65H 59/06* (2006.01)

(52) U.S. Cl.
USPC ..... 242/423.1; 242/171; 242/566; 242/588.3; 242/615.3; 242/129

(58) Field of Classification Search
USPC .............. 242/170, 171, 172, 566, 588, 588.3, 242/588.6, 615, 615.3, 129, 423–423.1; 206/407–409
See application file for complete search history.

(56) References Cited

U.S. PATENT DOCUMENTS

| | | |
|---|---|---|
| 318,062 A | 5/1885 | Warren |
| 532,565 A | 1/1895 | Kilmer |
| 617,353 A | 1/1899 | Redmond |
| 627,722 A | 6/1899 | Edwards |
| 932,808 A | 8/1909 | Pelton |
| 1,640,368 A | 8/1927 | Obetz |
| 1,907,051 A | 5/1933 | Emery |
| 2,059,462 A | 11/1936 | Jungmann |
| 2,407,746 A | 9/1946 | Johnson |
| 2,713,938 A | 7/1955 | Snyder |
| 2,724,538 A | 11/1955 | Schweich |
| 2,849,195 A | 8/1958 | Richardson |
| 2,864,565 A | 12/1958 | Whearley |
| 2,869,719 A | 1/1959 | Hubbard |
| 2,880,305 A | 3/1959 | Baird |
| 2,929,576 A | 3/1960 | Henning |
| 2,966,258 A | 12/1960 | Krafft |

(Continued)

FOREIGN PATENT DOCUMENTS

| | | |
|---|---|---|
| CA | 2460380 A1 | 9/2005 |
| CN | 1626423 A | 6/2005 |

(Continued)

OTHER PUBLICATIONS

International Preliminary Report on Patentability for application PCT/IB2010/000380 dated Jun. 8, 2011.

(Continued)

*Primary Examiner* — William E Dondero
(74) *Attorney, Agent, or Firm* — Hahn Loeser & Parks LLP

(57) ABSTRACT

A container includes side walls and a floor panel for packaging coiled wire, which may be welding wire. A wire dispensing apparatus is included that pays-off wire from the coil without tangling or twisting. The wire dispensing apparatus incorporates a plurality of flexible protrusions that extend from a base constructed to minimally contact the coil of wire. In particular, the wire dispensing apparatus incorporates an angled or curved base that rests against an inner circumference of the coiled wire.

10 Claims, 7 Drawing Sheets

(56) References Cited

U.S. PATENT DOCUMENTS

| | | |
|---|---|---|
| 2,974,850 A | 3/1961 | Mayer |
| 3,185,185 A | 5/1965 | Pfund |
| 3,244,347 A | 4/1966 | Jenk |
| 3,478,435 A | 11/1969 | Cook |
| 3,491,876 A | 1/1970 | Zecchin |
| 3,512,635 A | 5/1970 | Lang |
| 3,565,129 A | 2/1971 | Field |
| 3,567,900 A | 3/1971 | Nelson |
| 3,576,966 A | 5/1971 | Sullivan |
| 3,595,277 A | 7/1971 | Lefever |
| 3,648,920 A | 3/1972 | Stump |
| 3,724,249 A | 4/1973 | Asbeck et al. |
| 3,729,092 A | 4/1973 | Marcell |
| 3,799,215 A | 3/1974 | Willems |
| 4,044,583 A | 8/1977 | Kinney, Jr. |
| 4,074,105 A | 2/1978 | Minehisa et al. |
| 4,102,483 A | 7/1978 | Ueyama et al. |
| 4,172,375 A | 10/1979 | Rushforth et al. |
| 4,188,526 A | 2/1980 | Asano |
| 4,254,322 A | 3/1981 | Asano |
| 4,293,103 A | 10/1981 | Tsukamoto |
| 4,464,919 A | 8/1984 | Labbe |
| 4,546,631 A | 10/1985 | Eisinger |
| 4,582,198 A | 4/1986 | Ditton |
| 4,585,487 A | 4/1986 | Destree et al. |
| 4,623,063 A | 11/1986 | Balkin |
| 4,869,367 A | 9/1989 | Kawasaki et al. |
| 4,891,493 A | 1/1990 | Sato et al. |
| 4,949,567 A | 8/1990 | Corbin |
| 5,078,269 A | 1/1992 | Dekko et al. |
| 5,105,943 A | 4/1992 | Lesko et al. |
| 5,109,983 A | 5/1992 | Malone et al. |
| 5,205,412 A | 4/1993 | Krieg |
| 5,227,314 A | 7/1993 | Brown et al. |
| 5,277,314 A | 1/1994 | Cooper et al. |
| 5,368,245 A | 11/1994 | Fore |
| 5,372,269 A | 12/1994 | Sutton et al. |
| 5,452,841 A | 9/1995 | Sibata et al. |
| 5,485,968 A | 1/1996 | Fujioka |
| 5,494,160 A | 2/1996 | Gelmetti |
| 5,553,810 A | 9/1996 | Bobeczko |
| 5,590,848 A | 1/1997 | Shore et al. |
| 5,692,700 A | 12/1997 | Bobeczko |
| 5,739,704 A | 4/1998 | Clark |
| 5,746,380 A | 5/1998 | Chung |
| 5,816,466 A | 10/1998 | Seufer |
| 5,819,934 A | 10/1998 | Cooper |
| 5,845,862 A | 12/1998 | Cipriani |
| 5,865,051 A | 2/1999 | Otzen et al. |
| 5,971,308 A | 10/1999 | Boulton |
| 6,016,911 A | 1/2000 | Chen |
| 6,019,303 A | 2/2000 | Cooper |
| 6,155,421 A | 12/2000 | Cooper |
| 6,237,768 B1 | 5/2001 | Cipriani |
| 6,260,781 B1 | 7/2001 | Cooper |
| 6,301,944 B1 | 10/2001 | Offer |
| 6,322,016 B1 | 11/2001 | Jacobsson et al. |
| 6,340,522 B1 | 1/2002 | Burke et al. |
| 6,464,077 B1 | 10/2002 | Liu |
| 6,547,176 B1 | 4/2003 | Blain et al. |
| 6,564,943 B2 | 5/2003 | Barton et al. |
| 6,636,776 B1 | 10/2003 | Barton et al. |
| 6,648,141 B2 | 11/2003 | Land |
| 6,649,870 B1 | 11/2003 | Barton et al. |
| 6,708,864 B2 | 3/2004 | Ferguson, III et al. |
| 6,745,899 B1 | 6/2004 | Barton |
| 6,749,139 B2 | 6/2004 | Speck |
| 6,821,454 B2 | 11/2004 | Visca et al. |
| 6,889,835 B2 | 5/2005 | Land |
| 6,913,145 B2 | 7/2005 | Barton et al. |
| 6,938,767 B2 | 9/2005 | Gelmetti |
| 6,977,357 B2 | 12/2005 | Hsu et al. |
| 7,004,318 B2 | 2/2006 | Barton |
| 7,147,176 B2 | 12/2006 | Rexhaj |
| 7,152,735 B2 | 12/2006 | Dragoo et al. |
| 7,156,334 B1 | 1/2007 | Fore, Sr. et al. |
| 7,178,755 B2 | 2/2007 | Hsu et al. |
| 7,198,152 B2 | 4/2007 | Barton et al. |
| 7,220,942 B2 | 5/2007 | Barton et al. |
| 7,309,038 B2 | 12/2007 | Carroscia |
| 7,377,388 B2 | 5/2008 | Hsu et al. |
| 7,410,111 B2 | 8/2008 | Carroscia |
| 2002/0003014 A1 | 1/2002 | Homma |
| 2002/0014477 A1 | 2/2002 | Lee et al. |
| 2004/0020041 A1 | 2/2004 | Ferguson, III et al. |
| 2004/0155090 A1 | 8/2004 | B.-Jensen |
| 2006/0027699 A1 | 2/2006 | Bae et al. |
| 2007/0272573 A1 | 11/2007 | Gelmetti |
| 2008/0110779 A1 | 5/2008 | Fabian |
| 2009/0014572 A1 | 1/2009 | Weissbrod et al. |
| 2009/0014579 A1 | 1/2009 | Bender et al. |
| 2010/0012540 A1 | 1/2010 | Gelmetti |

FOREIGN PATENT DOCUMENTS

| | | |
|---|---|---|
| DE | 1011840 B | 7/1957 |
| DE | 1082215 | 11/1957 |
| DE | 2122958 | 11/1972 |
| DE | 2202177 | 7/1973 |
| DE | 103 60 466 A1 | 7/2005 |
| EP | 0519424 A1 | 12/1992 |
| EP | 0686439 A1 | 12/1995 |
| EP | 1057751 A1 | 12/2000 |
| EP | 1 295 813 A2 | 3/2003 |
| EP | 1295813 A2 | 3/2003 |
| EP | 1 698 421 A2 | 9/2006 |
| FR | 1215111 | 4/1960 |
| FR | 2055181 | 5/1971 |
| FR | 2595674 | 3/1988 |
| GB | 880502 | 10/1961 |
| GB | 1168928 | 10/1969 |
| GB | 1229913 | 4/1971 |
| GB | 2059462 | 4/1981 |
| GB | 2 332 451 A | 6/1999 |
| JP | 49-13065 | 2/1974 |
| JP | 54-043856 | 4/1979 |
| JP | 55-156694 | 12/1980 |
| JP | 56-023376 | 3/1981 |
| JP | 57-102471 | 6/1982 |
| JP | 58-035068 | 3/1983 |
| JP | 58-70384 | 5/1983 |
| JP | 58144561 A | 8/1983 |
| JP | 59-197386 | 11/1984 |
| JP | 59-229287 | 12/1984 |
| JP | 59-232669 | 12/1984 |
| JP | 60-021181 | 2/1985 |
| JP | 60-032281 | 2/1985 |
| JP | 60-184422 | 9/1985 |
| JP | 60-223664 | 11/1985 |
| JP | 61-293674 | 12/1986 |
| JP | 62-009774 | 1/1987 |
| JP | 62-111872 | 5/1987 |
| JP | 62-287055 | 12/1987 |
| JP | 63-147781 | 6/1988 |
| JP | 1-65265 | 4/1989 |
| JP | 1-240222 | 9/1989 |
| JP | 3264169 A | 11/1991 |
| JP | 4-112169 A | 4/1992 |
| JP | 04-133973 | 5/1992 |
| JP | 4-274875 | 9/1992 |
| JP | 5178538 A | 7/1993 |
| JP | 6023966 A | 2/1994 |
| JP | 8040642 A | 2/1996 |
| JP | 08-150492 | 6/1996 |
| JP | 08-267274 | 10/1996 |
| JP | 2000202630 A | 7/2000 |
| JP | 2000-225468 | 8/2000 |
| JP | 2000-263239 | 9/2000 |
| JP | 2001026375 A | 1/2001 |
| JP | 2001-150187 | 6/2001 |
| JP | 2004-025242 | 1/2004 |
| JP | 2004-025243 | 1/2004 |
| JP | 2007-927 A | 1/2007 |
| JP | 2007-29971 A | 2/2007 |

(56) References Cited

FOREIGN PATENT DOCUMENTS

| KR | 20020077857 A | 10/2002 |
|----|---|---|
| SU | 793678 | 1/1981 |
| SU | 1412830 | 7/1988 |
| WO | 8810230 | 12/1988 |
| WO | 94-00493 | 1/1994 |
| WO | 94-19258 | 9/1994 |
| WO | 00-50197 | 8/2000 |
| WO | 03-106096 A1 | 12/2003 |
| WO | 2005061168 A1 | 7/2005 |
| WO | 2007149689 A2 | 12/2007 |
| WO | 2009007845 A2 | 1/2009 |

OTHER PUBLICATIONS

ESAB Marathon Pac Endless Feedability, ESAB Market Communications/BA/November 2004, 27 pages.
Now there's no end to robot productivity. Uninterupted Mag-Welding With Endless Marthon Pac Wire Delivery, Mar. 11, 2004, pp. 1-8.
The Squaring of the Circle, CIFE Brochure.
Weld Point Robotic Welding Wire, Gas Tech Brochure.
Lincoln Electric Completes Italian Acquisition, News/Lincoln Electric, web page, Aug. 23, 2009.
Premium Quality Twist-Free Robotic Welding Wire, Prostar, Nov. 1997.
Premium Quality Twist-Free Robotic Welding Wire, Prostar, Jul. 1999.
Premium Quality Twist-Free Robotic Welding Wire, Prostar, Apr. 2000.
The Squaring of the Circle, CIFE Brochure, LEITC000544-LEITC000551.
Weld Point Robotic Welding Wire, Technology of the Future, LEITC000532-LEITC000539, Jan. 23, 2001.
U.S. Appl. No. 11/774,636, filed Jul. 9, 2007.
U.S. Appl. No. 12/036,660, filed Feb. 25, 2008.
International Search Report issued on Dec. 22, 2008.
Reply to International Search report dated Jun. 2, 2009.
International Preliminary Report on Patentability issued on Oct. 19, 2009.
Letter from Norman Soloway at Hayes Soloway, dated Oct. 14, 2010.
U.S. Appl. No. 60/298,555, filed Jun. 15, 2001, for "S" Shaped Cast in Wire Applicant David J. Barton.

WIRE DISPENSING APPARATUS FOR PACKAGED WIRE

This application is a divisional patent application of U.S. patent application Ser. No. 12/401,154 filed on Mar. 10, 2009 of which priority is claimed to and is incorporated herein by reference in their entirety.

TECHNICAL FIELD

The present invention pertains to an apparatus for dispensing wire, and more particularly, to a welding wire payoff apparatus used to dispense welding wire from a drum or other container.

BACKGROUND OF THE INVENTION

Wire is frequently packaged and stored in containers for delivery to an end user. In particular, wire such as that used for welding or soldering, is wound in coils as it is packaged in drums or boxes. Once shipped to the end user, the wire is dispensed from the container for use in any number of processes. In many instances, the wire is left in the container and metered out as needed without removing the entire coil. To facilitate easy removal, suppliers frequently incorporate a twist in the wire as it is fed into the drum. This helps the wire emerge without rotating as it is drawn back out.

However dispensing wire from coils presents the problem of unwinding the wire smoothly without intertwining or forming knots, which can lead to defects or breaks in the wire resulting in costly downtime. The wire may tangle in any number of ways. For example, multiple loops of wire may lift off from the top of the coil at the same time entangling the wire as it drawn from the drum. In other instances, loops of wire may unravel and fall behind the coil causing the wire to intertwine.

What is needed is a device that minimally contacts the coil thereby allowing strands of wire to be dispensed from a container without tangling and kinking. A primary purpose of this invention is to provide such an arrangement with its various attendant advantages.

BRIEF SUMMARY

The embodiments of the present invention pertain a wire guiding apparatus for dispensing coiled wire from a container, which includes a base having a wall member that minimally contacts the coiled wire at a region proximal to its inner circumference. The wire guiding apparatus also includes a plurality of protrusions, which may be elastically deformable, that are affixed to a rim portion and that extend radially outward toward the walls of the container, or in an alternate embodiment inwardly toward the center of the coil.

DETAILED DESCRIPTION OF THE INVENTION

Figure 1:
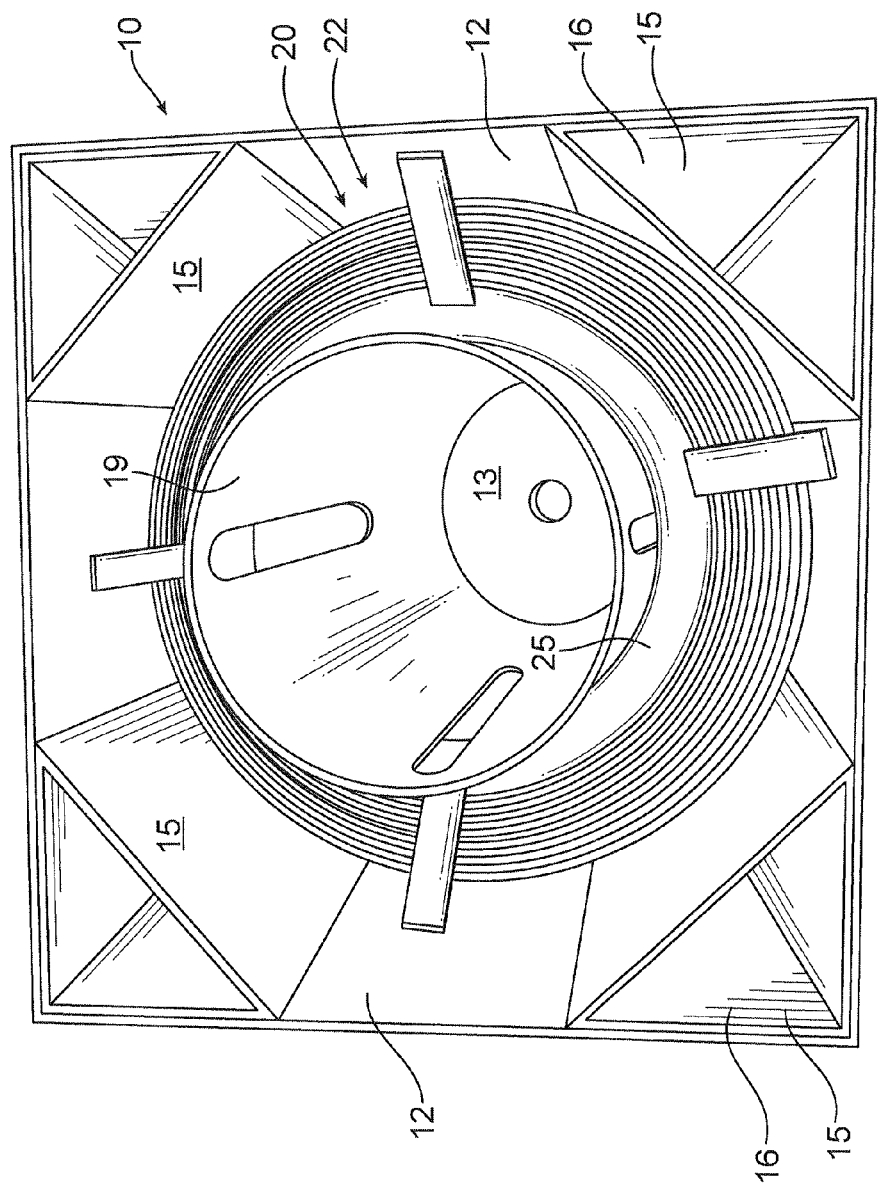
FIG. 1 is a perspective view of wire dispensing apparatus placed on a stack of packaged wire according to the embodiments of the subject invention.

Referring now to the drawings wherein the showings are for purposes of illustrating embodiments of the invention only and not for purposes of limiting the same, FIG. 1 shows a container 10 storing a quantity of contiguously formed wire depicted generally at 20. The container 10 may be generally concave having multiple sides 12 and a floor panel 13. The container 10 may be constructed from durable material capable of supporting the wire 20 during storage and transit, of which the wire 20 may be stacked in the container 10 in a coiled fashion. One example of durable material incorporates cardboard, which may be corrugated. Although any material may be used to construct the container 10 as is appropriate for use with the embodiments of the present invention. Wire 20 may be stored in the container by successively layering loops of the wire 20 around a core 19. A wire dispensing guide 25, also termed wire guiding apparatus 25, is fashioned to rest on an edge of the stacked or coiled wire 20, in cooperation with gravity. In one embodiment, the wire dispensing guide 25 minimally contacts the stack of coiled wire 20 and inhibits multiple loops of wire from paying-off the stack at the same time as will be discussed in detail in a subsequent paragraph.

The interior of the container 10 may be configured for receiving the wire 20. In one embodiment, the container 10 may be drum-like having a circular cross-section. Alternative embodiments incorporate cubical containers 10 having four side walls 12 connected together by a floor panel 13 as mentioned above. Inserts 15 may be added that create a polygonal boundary inscribing the outer perimeter of the coiled wire 20. In particular, corner inserts 16 may be placed vertically within the container 10 creating an octagonal boundary. Additionally, the container 10 may be covered by a container lid, not shown, constructed to prevent debris and other contaminants from entering the container 10.

Figure 3:
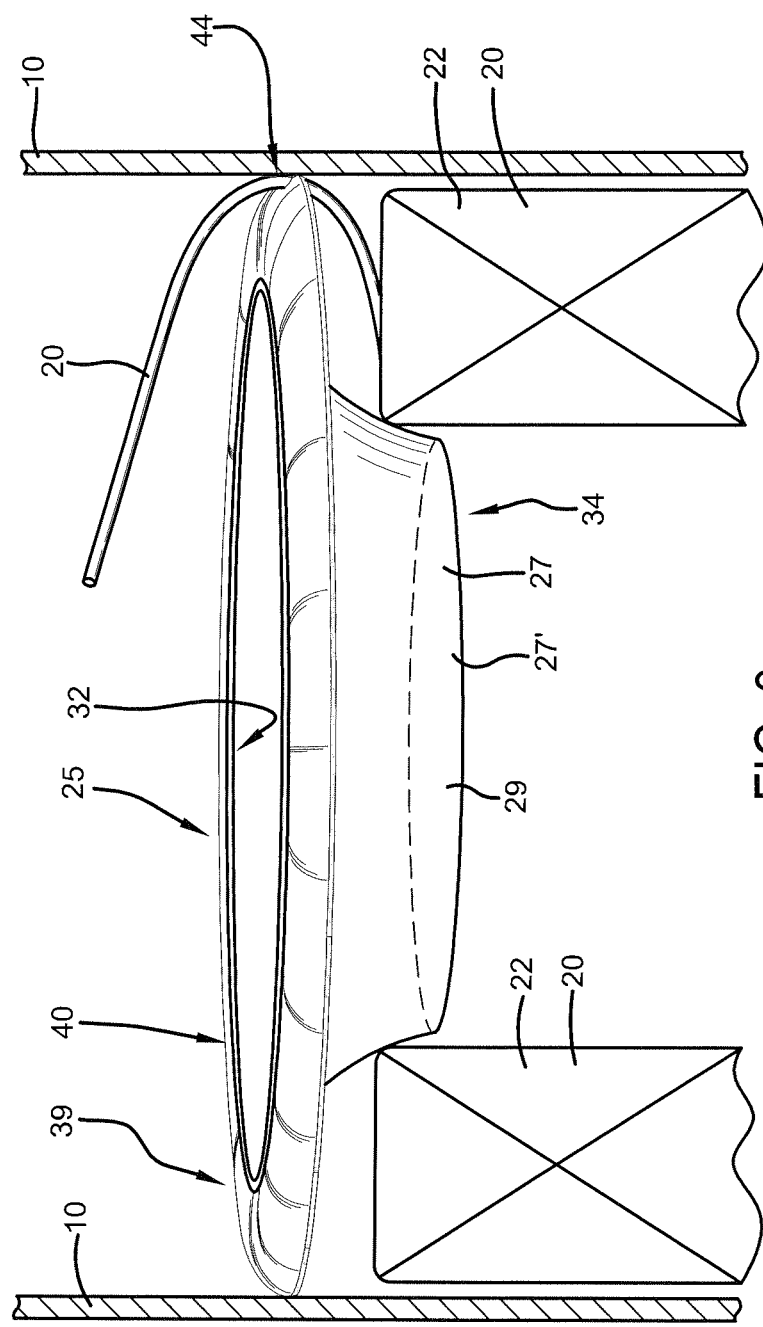
FIG. 3 is a partial cross-sectional view of one embodiment of a wire dispensing apparatus minimally contacting an associated stack of coiled wire according to the embodiments of the subject invention.

With continued reference to FIG. 1 and now also to FIG. 3, a wire dispensing guide 25 may be placed inside the container 10 and positioned proximal to the top of the coil 22 for controlling and/or regulating the smooth flow of the wire 20 as it is drawn from the container 10. As mentioned above, the wire dispensing guide 25 is configured for minimal contact with the coil 22 of wire 20. By limiting the amount of weight and the degree of surface contact between the coil 22 and the wire dispensing guide 25, the wire 20 may be drawn from the top of the coil 22 with minimal interference thereby reducing the possibility of multiple loops of wire 20 becoming intertwined. In an exemplary manner, the wire dispensing guide 25 may touch the wire 20 at the inner circumference of the coil 22. More specifically, the wire dispensing guide 25 may substantially tangentially contact the inner circumference of the coil 22.

Additionally, the wire dispensing guide 25 may incorporate means for restricting multiple loops of wire 20 from rising off the top of the coil 22 at the same time. Such means for restricting may extend from a base or base member of the wire dispensing guide 25 to the walls 12 of the container 10, as will be discussed in detail below. In this way, only single strands of wire 20 payoff through the restricting means. Of course, as the wire 20 is drawn from the container 10, the height of the coil 22 will diminish. Persons of ordinary skill in the art will readily see that gravity will maintain contact between the coiled wire 20 and the wire dispensing guide 25 until reaching the bottom of the container 10.

Figure 2:
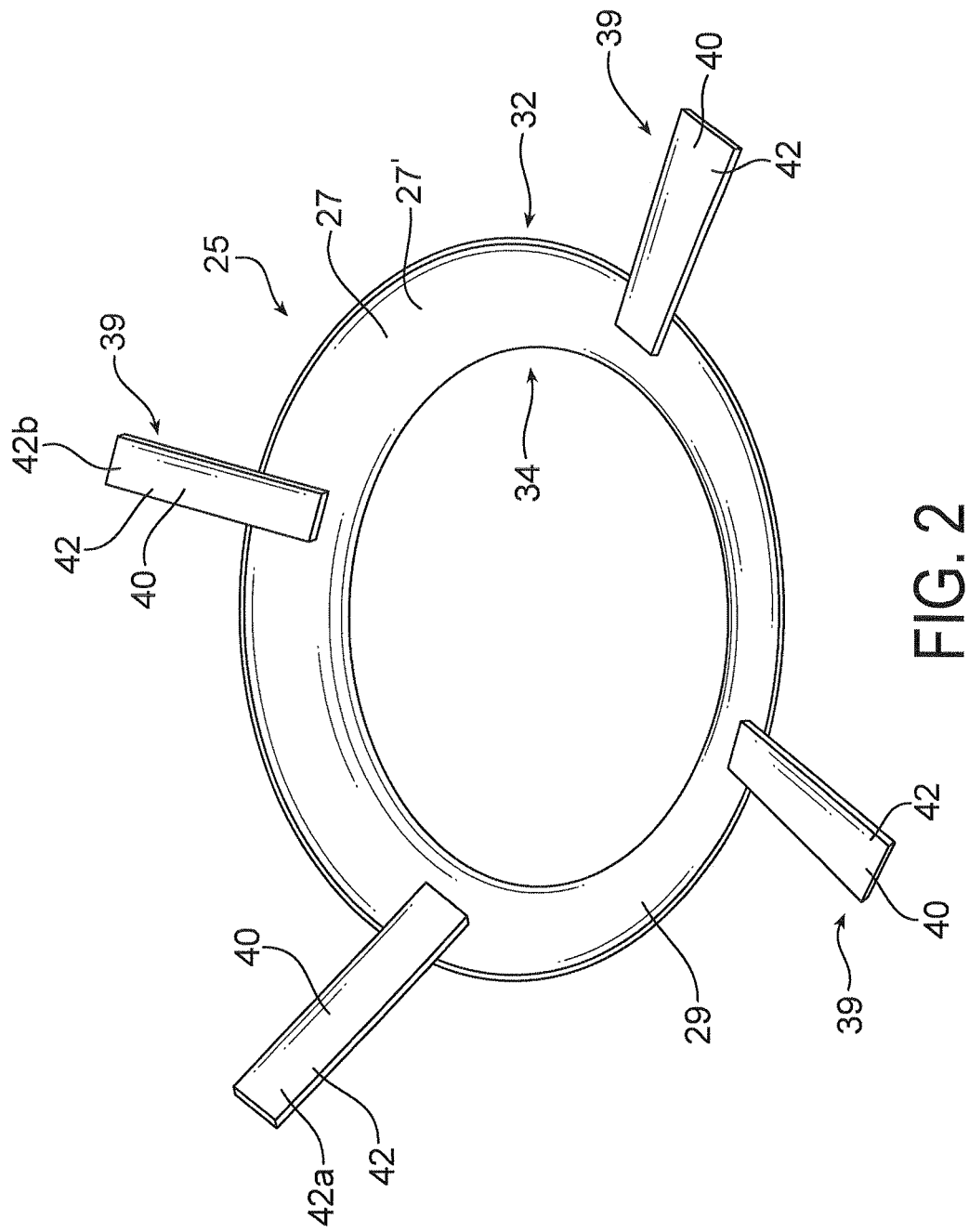
FIG. 2 is a perspective view of a wire dispensing apparatus according to the embodiments of the subject invention.
Figure 4:
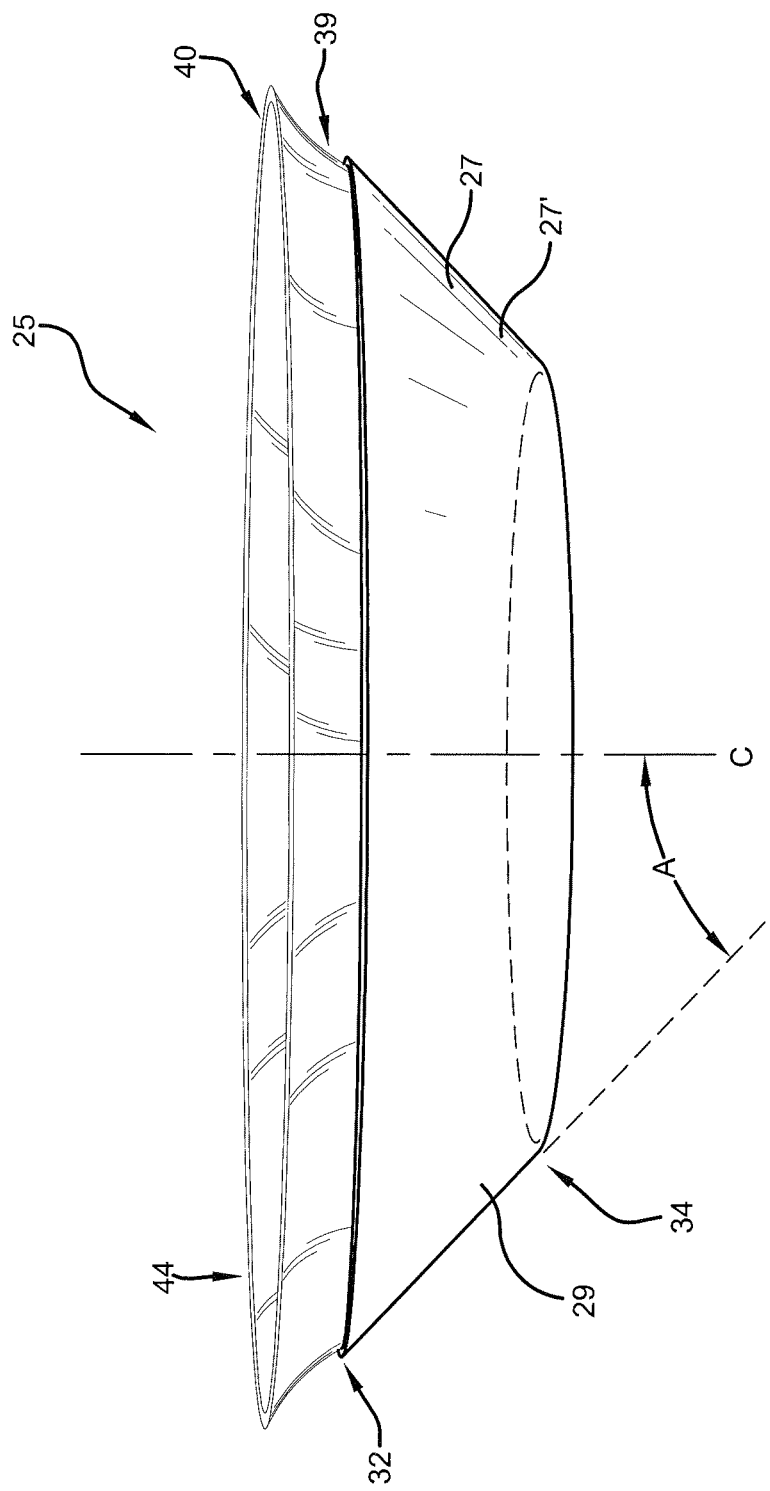
FIG. 4 is a perspective view of another embodiment of a wire dispensing apparatus according to the embodiments of the subject invention.

With reference now to FIGS. 2 through 4, the wire dispensing guide 25 may include a base 27 or base portion 27. In one embodiment, the base 27 may be contiguously formed from a band of material. In particular, the base 27 may be formed into a ring thereby comprising an annular base 27', which may have a generally circular cross-section and a characteristic centerline axis C. It is noted here that the cross-sectional configuration of the base 27 should not be construed as limiting. Rather, other shapes and configurations of the base 27, including but not limited to polygonal shapes, may be incorporated without departing from the intended scope of coverage. In this manner, the band of material comprises a wall 29 or wall member 29 of the wire dispensing guide 25.

As can be seen from the figures, the wall member 29 has a characteristic width W. It follows that distal ends of the wall member 29 define a first rim 32 and a second rim 34 respectively. The diameter of the base 27 may correspond to the diameter of the inner circumference of the coil 22. In one embodiment, the wall member 29 may be angled with respect to the centerline axis C. The angle A of the wall member 29 and the circumference of the first and second rims 32, 34 may be configured to tangentially contact the inner circumference of the coil 22. The angle A may range substantially from between 25° and 85°. More specifically, the angle A may be approximately 45°. Accordingly, the first rim 32 may comprise a first upper rim 32 extending above the top surface of the coil 22. Likewise, the second rim 34 may comprise a second lower rim 34 extending below the surface of the coil 22. In this instance, it will be readily seen that circumference or diameter of the first upper rim 32 is larger than the second lower rim 34. However, any angle A and circumference or diameter of the first and second rims 32, 34 may be chosen as is appropriate for use with the embodiments of the present invention. It will be readily seen that the angled nature of the base 27, allows the wire dispensing guide 25 to be used with a variety of coils 22 having different inner circumferential diameters.

It should be noted that FIGS. 2 and 4 depict a generally planar wall member 29. However, the wall member 29 may be also curved as shown in FIG. 3. Any radius of curvature may be used to fashion the wall member 29, which allows the wire dispensing guide 25 to substantially tangentially contact the coil 22. Still, any configuration of wall member 29 and base 27 may be chosen as is appropriate for use with the embodiments of the present invention.

With continued reference to FIG. 2, the base 27 of the wire dispensing guide 25 may be constructed from a polymeric material. One exemplary type of material may be Acrylic. In another embodiment, the polymeric material may be a thermoplastic material. As such, the base 27 may be constructed by one of several molding processes including but not limited to injection molding. The polymer used to construct the base may be comprised of a low density or light weight polymer, like for example low-density polyethylene. However, any material, polymer or otherwise, may be used to construct the wire dispensing guide 25.

Referring to FIGS. 2 and 4, as mentioned above, means 39 for restricting the wire 20, also referred to as restricting means 39, may extend from the wire dispensing guide 25, and more specifically from the base 27 of the wire dispensing guide 25. For illustrative purposes, the restricting means 39 is shown extending from the first upper rim 32. However, any portion of the base 27 may be chosen from which to extend the restricting means 39 as is appropriate for use with the embodiments of the subject invention. In one embodiment, the restricting means 39 may comprise protrusions 40, which may be generally flexible. By flexible it is meant that the protrusions 40 may bend or move thereby allowing a strand of wire 20 to pass over the wire dispensing guide 25 during payoff. However, it is expressly noted that the protrusions may possess a certain degree of stiffness. Stated another way, the protrusions 40 may be elastically deformable returning to its original shape after the wire 20 has been drawn over the wire dispensing guide 25.

The protrusions 40 may be fixedly connected with respect to the base 27. As previously mentioned, the base 27 may be constructed from a polymeric or thermoplastic material. Accordingly, the protrusions 40 may be over-molded into the base 27 during the forming process or alternatively embedded into the base 27 in a separate assembly process. Other embodiments contemplate protrusions 40 that may be fastened onto the base 27 via adhesives or other means chosen with sound engineering judgment. Still, any manner may be chosen for assembling the protrusions 40 respective of the base 27.

With reference again to FIGS. 2 through 4, the protrusions 40 may be fixedly attached to the base 27 but flexible for allowing the upper most strand of wire 20 to pull through during payoff. As the wire 20 is being withdrawn from the container 10, the feed end, i.e. the upper-most strand, will be pulled upward over the wire dispensing guide 25 by, for example, a wire feeder motor, not shown. The feed end of the wire 20 will contact the protrusions 40 radially at different locations around the circumference of the wire dispensing guide 25. Force from drawing out the wire 20 will cause the protrusions 40 at that particular location to flex thereby allowing the wire 20 to pass over the wire dispensing guide 25. The protrusions 40 will then return to its original position into contact with the side walls 12 of the container 10. The stiffness of the protrusions 40 may be sufficiently rigid to prevent subsequent loops of wire 20 from passing through the wire dispensing guide 25 at the same time. It is noted that the subsequent loops of wire 20 are not being drawn from the container 10. While spring forces stored in the coil 22 may cause the subsequent loops of wire 20 to lift off the coil stack, the stiffness of the protrusions 40 may prevent the subsequent loops of wire 20 from passing over the wire dispensing guide 25 thereby minimizing the potential for tangles.

Referring once again to FIG. 2, the protrusions 40 may comprise flexible leaves 42. The leaves 42 may be generally flat and longitudinal. In one embodiment, the leaves 42 may be constructed from a polymeric material, like for example, nylon or polyethylene. However, any material may be utilized that provides the appropriate amount of stiffness needed to allow a single loop of wire 20 to be pulled over the leaves 42 while preventing subsequent loops of wire 20 from doing the same.

Additionally, the number of flexible leaves 42 may vary. Four (4) leaves 42 are shown in the accompanying Figure. However, any number of leaves 42 may be extended from the base 27. The wire dispensing guide 25 may incorporate a discrete number of leaves 42, which is to say that one leaf 42a is visually distinguishable from the another leaf 42b. This is to be contrasted with other embodiments incorporating a large quantity of overlapping protrusions 40 as will be discussed further below. Spacing of the leaves 42 may occur radially around the circumference of the base 27. Specifically, the radially spaced apart leaves 42 may be equidistant from each other. Although, any pattern of spacing may be selected without departing from the scope of coverage.

FIGS. 3 and 4 depicts another embodiment of protrusions 40. In this embodiment, the protrusions 40 may be comprised flexible bristles 44. The bristles 44 may be hair-like in configuration constructed from relatively thin filaments. The material comprising the bristles 44 may be derived from a polymeric material. Examples may include, but are not limited to, Polyethylene or Nylon. Although, any type of material may be used to construct the bristles 44 that can provide the appropriate amount of stiffness needed to allow a single loop of wire 20 to pass over the wire dispensing guide 25. In this embodiment, the wire dispensing guide 25 may include a large quantity of bristles 44, the number of which may be visually indistinguishable. In other words, a plethora of bristles 44 may be affixed with respect to the base 27. The bristles 44 may overlap in relationship to each other. In one exemplary configuration, the bristles 44 may be uniformly distributed around the circumference of the wire dispensing guide 25. The exact number of bristles 44 may vary. However, it is will be understood that a sufficient number of bristles 44 will be incorporated to function in a manner consistent with that described above.

Figure 5:
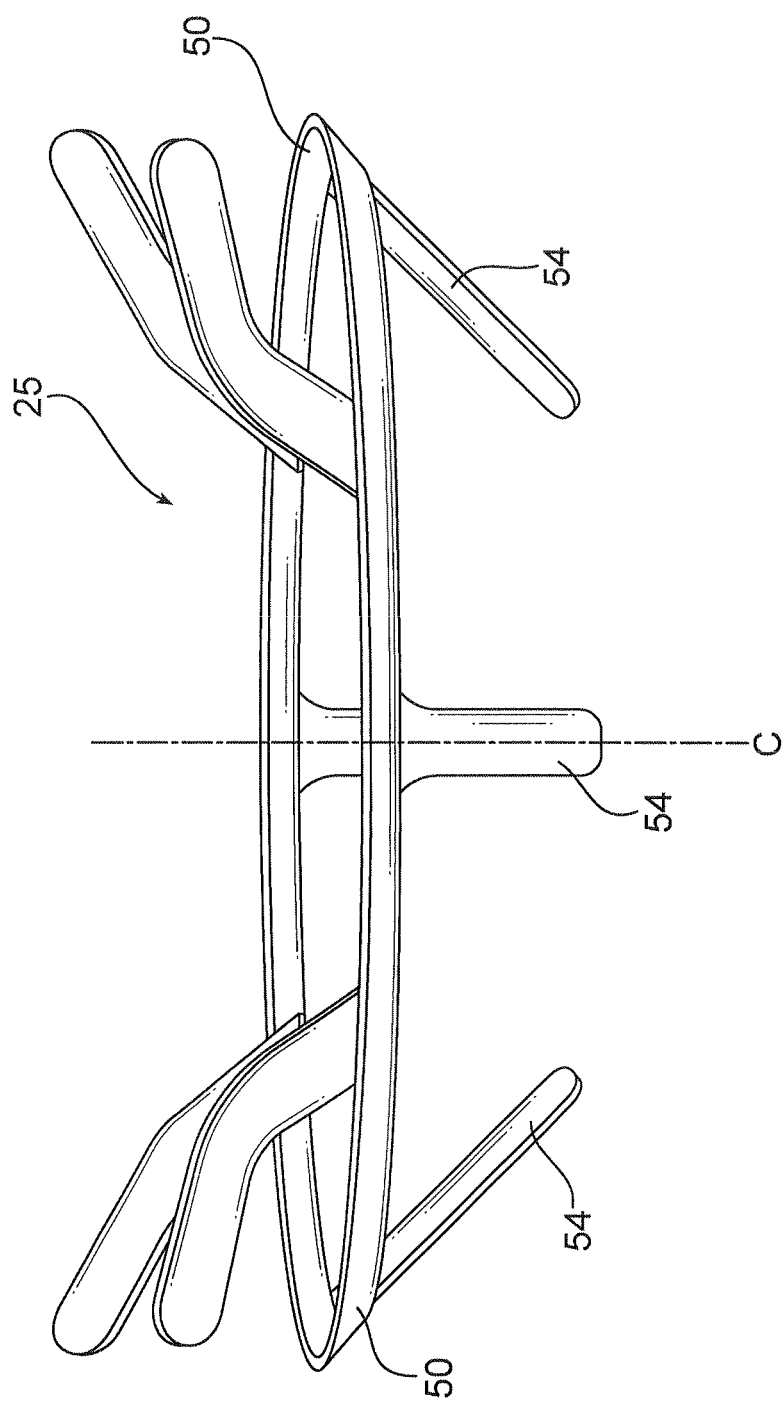
FIG. 5 is a perspective view of another embodiment of a wire dispensing apparatus according to the embodiments of the subject invention.

With reference now to FIG. 5, yet another embodiment of the wire dispensing guide 25 is illustrated. In this embodiment, the wire dispensing guide 25 may include a base member 50. However, the base member 50 may not contact the coil 22. Rather, support members 54 may extend from the base member 50 for use in minimally contacting the coil 22 substantially at a tangential point. The support member 54 may extend directly and rigidly from the base member 50. In particular, the support member 54 may be integrally fashioned with the base member 50 in a single molding process similar to that described above. Still, any manner may be selected for constructing the base member 50 of the present embodiment. In an exemplary manner, four (4) support member 54 are shown extended from the base member 50. However, fewer or more support members 54 may be included. In this manner, a discrete number support members 54 extend from the base member 50 in one direction. It will be appreciated that the protrusions 40 extend from the base member 50 in an opposite direction.

Figure 6:
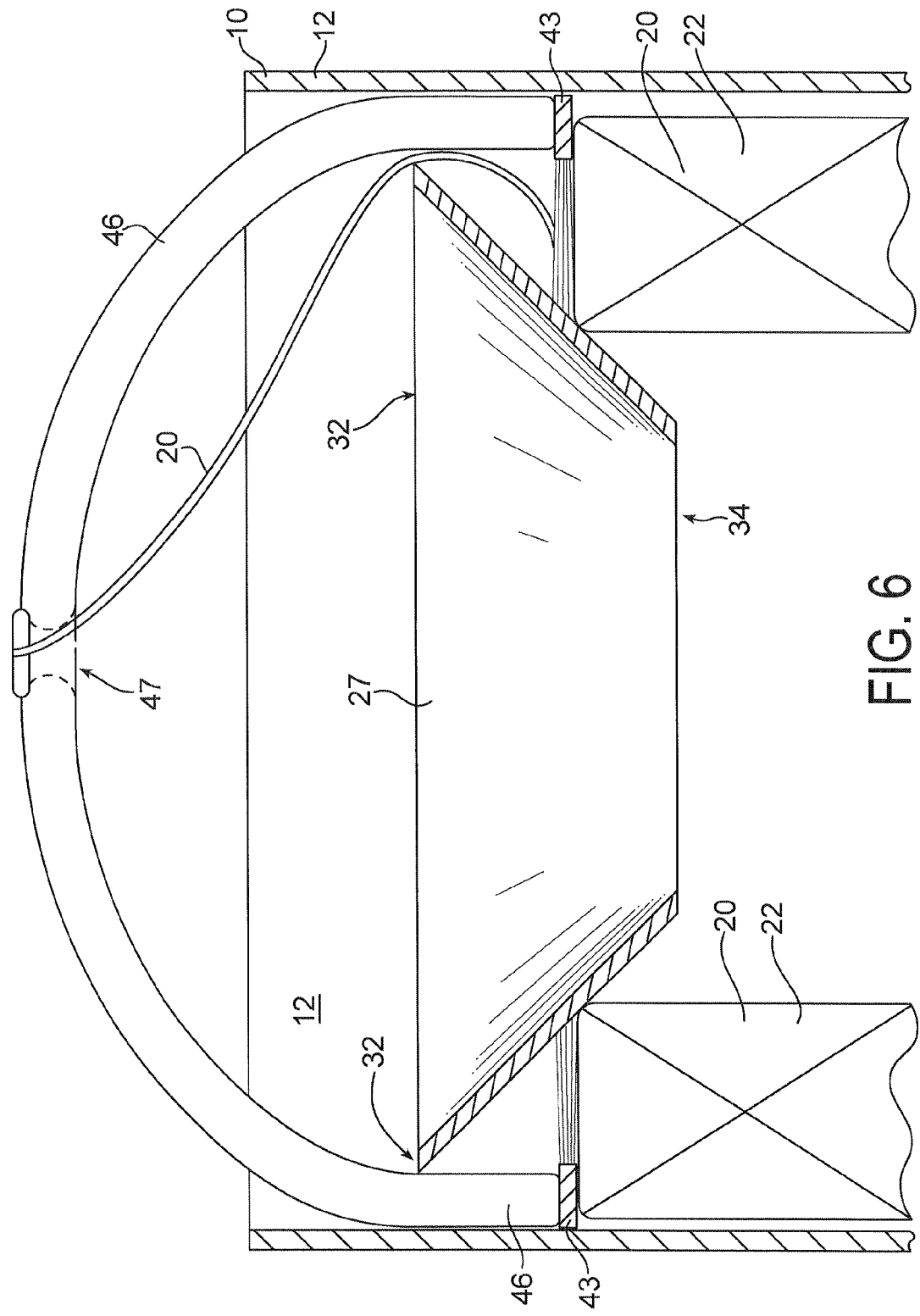
FIG. 6 is cross sectional view of coiled wire stored in a container and a wire payoff system having detached components according to the embodiments of the subject invention.
Figure 7:
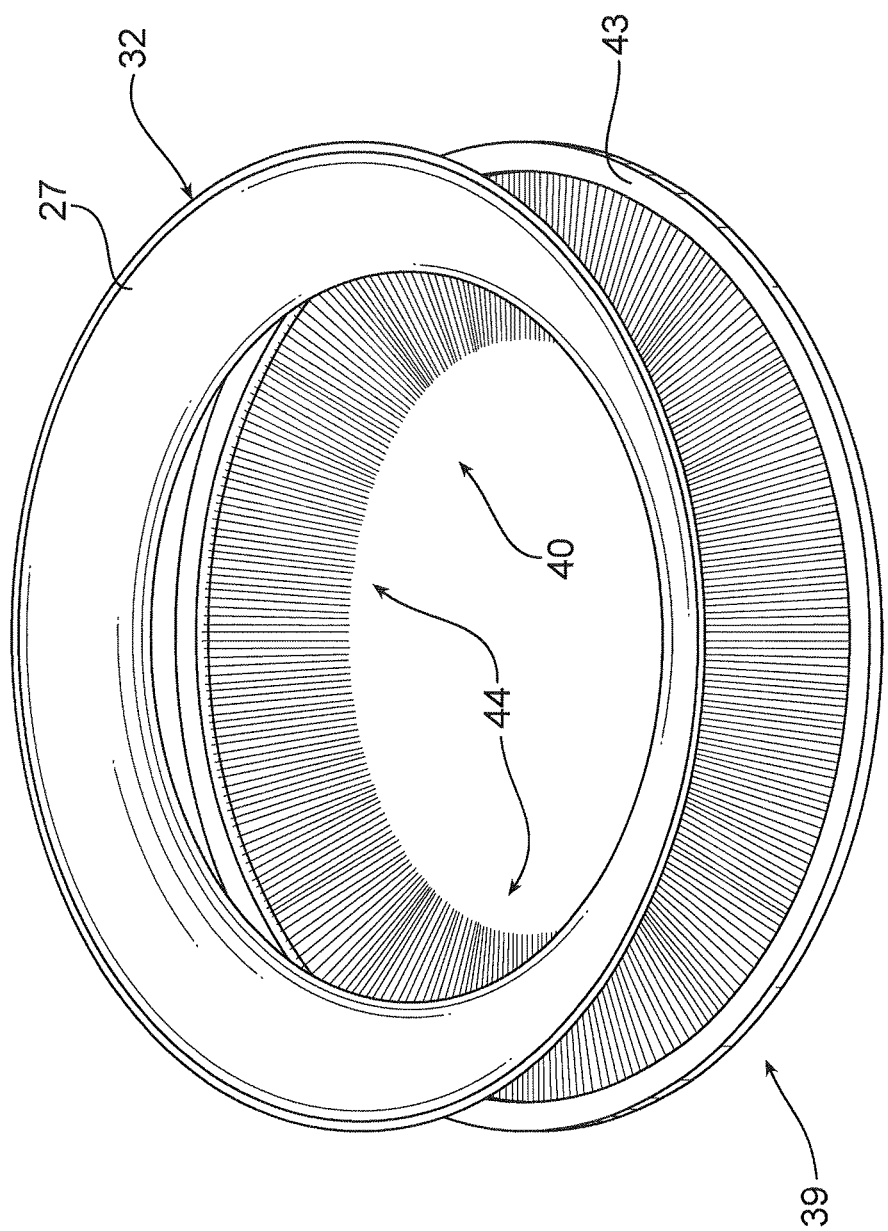
FIG. 7 is a perspective view of the wire payoff system of FIG. 6, according to the embodiments of the subject invention.

Referencing FIGS. 6 and 7, in another embodiment of the present invention, a wire payoff system may be comprised of two or more wire dispensing guide members, which may be distinctly separate units. In particular, restricting means 29 may be individually constructed and distinctly separate from the base 27. When placed together within the container 10, the two or more wire dispensing guide members function to prevent multiple loops of wire from paying out at the same time. In one particular embodiment, restricting means 29 lays directly on top of the coil 22, while the base 27 rests on an inner circumference of the coil 22.

The base 27 may be constructed in a manner consistent with that described above, wherein the base 27 is fashioned from a band of material having an upper 32 and lower 34 rims and angled or contoured walls, but without being directly attached to restricting means 39. The restricting means 39 may be fashioned as a separate unit formed in a ring-like manner including protrusions 40 comprised of leaves 42, bristles 44 or any other flexible member chosen with sound judgment. The protrusions 40 may extend from an annular frame member 43, also received onto the coil 22. In one embodiment, the protrusions 40 extend radially inward from the frame member 43. However, alternate embodiments are contemplated wherein the protrusions extend radially outward, or both radially inward and outward from the frame member 43. The frame member 43 may be generally disk shaped or rod-like in configuration, which is to that the frame member 43 has a square (or rectangular) or ovular (or circular) cross section respectively. In any case, the width and thickness of the frame member 43 may be considerably less than the length of the protrusions 40. It is noted here that the protrusions 40 may be generally fashioned with the frame member 43 in a single plane. That is to say that the protrusions 40 are generally perpendicular, i.e. substantially not angled, with respect to a center axis of the frame member 43. However, it is to be construed that protrusions 40 extending from the frame member 43 in any angled manner falls within the scope of coverage of the embodiments of the present invention.

In one exemplary embodiment, the protrusions 40 are comprised of elastically deformable bristles 44 that extend radially inward from the frame member 43. It should be noted that when the base 27 and restricting means 39 are assembled onto the coil 22, the bristles 44 lay across the top surface area of the coil 22, while the base 27 angles upwardly and radially outward with respect to the walls of the container 10, contacting the coil 22 at a region at or proximal to its inner circumference. During wire 20 payoff, the bristles 44 deflect allowing the wire 20 to be pulled through restricting means 39. The wire 20 then flows upward, against the perimeter of the upper rim 32 of the base 27, and out of the container 10.

The circumference of the frame member 43 may be substantially the same as the outer circumference of the coil 22. However, the circumference of the frame member 43 may be somewhat smaller than outer circumference of the coil 22. Additionally, the length of the bristles 44 may be close in dimension to the width of the coil cross section, such that the bristles 44 substantially cover the top surface area of the coil 22. Persons of ordinary skill in the art will understand that the wire 20, as it is drawn out, pays off the top of the coil 22 at various radial positions between the inner coil circumference and the outer coil circumference. Accordingly, the length of the bristles 44 may be sized to completely cover the top surface area of the coil 22 thereby preventing multiple loops of wire from paying out at the same time.

With reference to all of the Figures, use of the wire dispensing guide 25 will now be discussed. The wire dispensing guide 25 may be inserted into a container 10 storing a coiled stack of wire 20, which may be welding wire 20. The wire dispensing guide 25 may then be placed onto the coil of wire 20 such that the base 27 contacts the coiled wire 20 about a singular annulus, i.e. tangential rim around the circumference of the wire dispensing guide 25. At this position, the protrusions 40 will be in contact with the walls 12 of the container 10. The feed end of the wire 20 may then routed through the protrusions 40 and fed into a wire feeder device, like a wire feeder motor for continuous feed in welding or other type of operation. As the height of the coiled stack reduces, the wire dispensing guide 25 will fall with gravity toward the bottom of the container 10. Since the wall member 29 does not contact the top surface of the coil 22, the wire 20 will remain substantially uninhibited from contact with the wire dispensing guide 25 and can flow smoothly during payoff without becoming entangled.

In the embodiment comprising separable wire dispensing guide members, the base 27 may be set onto the inner circumference of the coil 22. The frame member 43 including the protrusions 40 may then be placed over the base 27 and onto the surface of the coil 22. It is expressly noted that the sequent of installing the detached wire dispensing guide members may be interchanged. The wire 20 is then pulled through the protrusions 40, which may be bristles 44, and routed around the upper rim 32 of the base 27 and connected with a wire feeder or other wire feeding apparatus. In one particular embodiment, a separate wire payout dome 46 incorporating a feed hole 47 through which the wire 20 is fed (shown in FIG. 6 but applicable to all of the embodiments of the present invention) may be placed onto the top of the container 10 during wire pay off.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A wire guiding apparatus for dispensing single loops of wire in a coil from a container having container walls, the coil of wire defining an inner circumference, said wire guiding apparatus consisting essentially of:
    a base including a wall member that tangentially contacts the coil of wire at a region proximal to the inner circumference, the wall member defining a rim portion; and,
    a plurality of thin flexible overlapping filaments said filaments only extending from a circumference of the rim to the container walls, said filaments affixed to the rim portion and extending radially outward from a top of said rim portion toward the container walls, a length of said filaments sized to completely cover a top surface of the coil, the plurality of filaments being elastically deformable for allowing single loops of associated wire to dispense from the coil at a peripheral end of said filaments and the container walls.

2. The wire guiding apparatus as defined in claim 1, wherein
    the base contacts the wire on the inner circumference.

3. The wire guiding apparatus as defined in claim 1, wherein
    the rim portion is annular in shape and comprises a first upper rim and a second lower rim that are substantially concentrically disposed with respect to a centerline axis of the base; and,
    wherein a circumference of the first upper rim is larger than a circumference of the second lower rim.

4. The wire guiding apparatus as defined in claim 3, wherein
    the base is substantially rigid and has a frustoconical shape.

5. The wire guiding apparatus as defined in claim 3 wherein
    the wall member is inwardly sloped from the first upper rim to the second lower rim; and,
    wherein the inwardly sloped wall member forms an angle A with respect to a centerline axis of the wire guiding apparatus, and wherein the angle A is in the range substantially between 25° and 85°.

6. The wire guiding apparatus as defined in claim 3, wherein
    the wall member is inwardly sloped from the first upper rim to the second lower rim; and,
    wherein the inwardly sloped wall member forms an angle A with respect to a centerline axis of the wire guiding apparatus, and wherein the angle A is substantially 45°.

7. The wire guiding apparatus as defined in claim 3, wherein
    the first upper rim has a larger diameter than the second lower rim; and,
    wherein the wall member is at least partially curved between the first upper rim and the second lower rim.

8. The wire guiding apparatus as defined in claim 3, wherein
    the second lower rim has a circumference smaller than the inner circumference of the coil of associated wire; and,
    wherein when the wire guide apparatus minimally contacts the coil of wire, the second lower rim extends below the top of the coil.

9. A wire payoff guide, consisting essentially of:
    an annularly-shaped contiguously formed band of material shaped to substantially tangentially contact an inner circumference of an associated coil of wire; and,
    a plurality of thin filament bristles extended from a top of the contiguously formed band of material at a distance sufficiently long to contact a wall of an associated packaging container, and wherein
    the bristles only extend radially around a circumference of the contiguously formed band of material at a substantially uniform density in overlapping relationship, the plurality of bristles being elastically deformable for allowing single loops of an associated wire to dispense from a coil of the wire at a peripheral end of the bristles and the container walls.

10. The wire payoff guide as defined in claim 9, wherein
    the contiguously formed band of material is constructed from a light weight polymeric material.

* * * * *

UNITED STATES PATENT AND TRADEMARK OFFICE
CERTIFICATE OF CORRECTION

| | | |
|---|---|---|
| PATENT NO. | : 8,794,561 B2 | Page 1 of 1 |
| APPLICATION NO. | : 12/882550 | |
| DATED | : August 5, 2014 | |
| INVENTOR(S) | : Fabian | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this
Twenty-ninth Day of December, 2015

Michelle K. Lee
*Director of the United States Patent and Trademark Office*